United States Patent [19]

Ballheimer

[11] 3,889,553

[45] June 17, 1975

[54] CONNECTING ROD ASSEMBLY

[75] Inventor: Benny Ballheimer, Peoria, Ill.

[73] Assignee: Caterpillar Tractor Co., Peoria, Ill.

[22] Filed: Feb. 21, 1974

[21] Appl. No.: 444,523

[52] U.S. Cl............... 74/579 R; 74/579 E; 403/344
[51] Int. Cl. .............................................. F16c 7/02
[58] Field of Search ..................... 74/579 E, 579 R

[56] References Cited
UNITED STATES PATENTS

| | | | |
|---|---|---|---|
| 2,473,096 | 6/1949 | Hamill et al...................... | 74/579 E |
| 3,751,080 | 8/1973 | Bailey et al. ..................... | 74/579 E |

FOREIGN PATENTS OR APPLICATIONS

| | | | |
|---|---|---|---|
| 535,538 | 1/1957 | Canada ............................ | 74/579 E |

Primary Examiner—Samuel Scott
Assistant Examiner—F. D. Shoemaker
Attorney, Agent, or Firm—Phillips, Moore, Weissenberger, Lempio & Strabala

[57] ABSTRACT

A connecting rod assembly having a novel crank pin end and cap construction for mounting a large diameter crank pin bearing in the joint which provides a limited width dimension of the crank pin end to permit removal of the connecting rod through the top of the engine block. The crank pin end is formed in the shape of a saddle having two parallel outer surfaces and two narrow flat end surfaces, each disposed at an acute angle to one of the flat outer surfaces. The cap is formed with a pair of upstanding legs having flat inner surfaces for matching said outer surfaces of the saddle, with the cap and saddle assembly formed to define a circular cylindric surface therebetween for receipt of the usual bearings and crankshaft journal. The cap is secured to the saddle with a pair of bolts extending in inclined positions from the connecting rod axis for providing force components to bring both end and side surfaces tightly together in clamping relation, with the whole construction being symmetrically assembled.

6 Claims, 2 Drawing Figures

CONNECTING ROD ASSEMBLY

BACKGROUND OF THE INVENTION

The present invention relates to a connecting rod assembly, and more particularly to a connecting rod assembly having a crank pin end and cap construction for mounting a large diameter crank pin bearing in a manner permitting disassembly of the connecting rod along with its associated piston through the top of the engine block.

The high cylinder pressures now existing in modern high performance engines require the use of larger crank pin bearings. This requirement has resulted in wider crank pin ends and their associated related bearing caps. Construction of such wider crank pin ends in a conventional manner prevents the removal of the pistons from the engine through the top of the block in accordance with the preferred method of disassembling the pistons from the engine. Therefore, a problem has arisen, which requires a redesign of the crank pin end and cap construction.

Others have attempted to overcome this problem, but such attempts have not been entirely satisfactory and have resulted in certain disadvantages rendering certain of these devices less effective than conventional construction. For example, it has been proposed to utilize strap-type bearing caps and angled-joint connecting rods. However, these constructions have resulted in a number of problems. One problem from the angle-joint connecting rods is that the joint is often located in a high load area. This results in leakage at the joint which reduces the oil film thereacross and permits scoring of the bearings. Another problem is that the serrations commonly used across the joint faces are difficult to manufacture and often do not mate properly. In addition, the major problem with strap-type caps is that they are extremely difficult to assemble on a connecting rod.

Therefore, it is seen that the need arises for an improved crank pin and cap construction, which will permit disassembly through the top of the engine block, yet which construction is as good as, or better than, conventional construction with respect to other factors.

SUMMARY OF THE INVENTION

In accordance with the present invention, a connecting rod assembly is provided, which has a crank pin bearing saddle formed with a pair of relatively thin side walls extending downwardly at the end with a semi-cylindrical bearing formed therein. Said side walls are thin to minimize their widths and permit withdrawal of the rod through the top of its associated engine block. A bearing cap is also provided, which has a pair of upstanding legs positionable against the outside of the relatively thin side walls of the crank pin saddle for providing same with adequate strength during operation.

An important feature of the invention is to provide fastening means which tightly clamp the legs to the saddle so that the assembled joint will have the desired strength at the crank pin end. It is also important, of course, to provide fastening means that will bring the cap tightly against the saddle so as to maintain the integrity against the severe thrust forces encountered during engine operation. In its preferred form, the fastening means comprises a pair of bolts angularly disposed with respect to the parallel outer surfaces of the saddle so as to provide clamping forces between the legs of the caps and the saddle sides, but with the main force component directed to hold the cap tightly against the saddle ends. In this way, all of the necessary fastening between the cap and the saddle may be achieved by one pair of bolts and the structure may be formed in symetrical fashion as is desired in such attachments.

Thus it is seen that a primary object of the invention is to provide a crank pin end and cap construction suitable for large diameter crank pin bearings, which is constructed for removal of the connecting rod through the top of the engine block, and yet which is of light-weight construction and otherwise contains all of the desireable features found in conventional construction.

Another object of the invention is to provide an improved connecting rod assembly of the character described, which is comparatively simple to manufacture and assemble, with assembly assuring the proper desired orientation of the parts.

In other words, it is important that the cap be exactly aligned with the saddle of the connecting rod so that the cylindrical bearing housing halves are exactly oriented with respect to each other. This is achieved simply by ordinary assembly procedures. In order to provide this accurate alignment, the end surfaces of the saddle are formed at an acute angle with the side surfaces thereof, and the recess formed in the cap between the legs is provided with matching surfaces abutting the ends of the saddle and the sides of the saddle. It will be appreciated that these surfaces which are provided at the end of the saddle and placed within the cap adjacent to the base of the upstanding legs thereof may be a configuration other than flat and still be within the ambit of the invention. However, flat surfaces are preferred because they may be accurately machined on both parts and easily made to fit together in the desired fashion.

Further objects and features of advantage of the invention will become apparent as the specification progresses.

BRIEF DESCRIPTION OF THE DRAWING

A preferred form of the invention is illustrated in the accompanying drawing forming a part of this description, in which.

Figure 1:
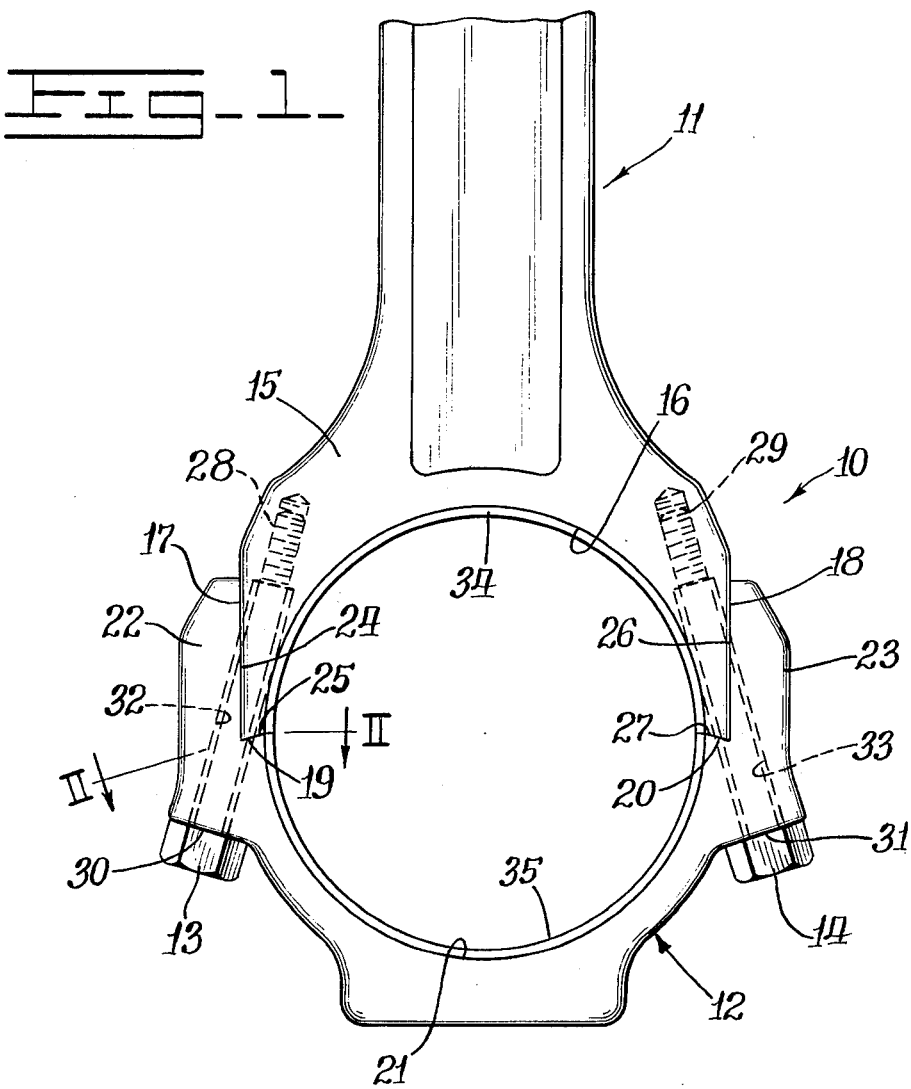
FIG. 1 is an elevation view of a connecting rod assembly constructed in accordance with the present invention.

While only the preferred form of the invention is shown, it should be understood that various changes or modifications may be made within the scope of the claims attached hereto without departing from the spirit of the invention.

DETAILED DESCRIPTION OF THE PREFERRED EMBODIMENT

Referring more particularly to the drawings, there is shown a crank pin and cap construction 10 comprising a connecting rod 11 and a cap 12 secured together by bolts 13 and 14. The lower end of connecting rod 11 is formed into a saddle 15 having a semi-cylindrical bearing bore 16, two substantially flat parallel surfaces 17 and 18, and a pair of end surfaces 19 and 20 disposed on each side of the bearing bore 16. It should be noted that the flat surfaces 17 and 18 are spaced a distance which only slightly exceeds the diameter of bearing bore 16, and as here shown, the excess is about 12% of the diameter of bearing bore. It will be appreciated, however, that the purpose of the close spacing is to enable the connecting rod to be removed through the top of the cylinder and generally the saddle will be kept small enough to achieve this purpose. Thus, the invention is particularly applicable to cylinders having relatively large crank shaft diameters at the connection with respect to the size of the cylinder diameter. It will also be appreciated that the surfaces 17 and 18 do not have to be exactly flat, but flat surfaces are preferred in order to provide ease of accurate machining and fabrication.

Cap 12 is a generally bifurcated structure having a bearing bore 21 on the inner surface thereof and a pair of generally upstanding legs 22 and 23. Leg 22 is formed with inner surfaces 24 and 25 shaped to match surfaces 17 and 19 of saddle 15. Similarly, leg 23 is formed with surfaces 26 and 27 shaped to match surfaces 18 and 20 of saddle 15. It will be noted that the distance between surface 24 and 26 conforms with the distance between surfaces 17 and 18 so that when cap 12 is slipped over saddle 15, bearing bores 16 and 21 are accurately aligned in circular fashion. It will also be noted that surface 19 is disposed at an acute angle with surface 17 and surface 20 is disposed at an acute angle with surface 18. In other words, surfaces 19 and 20 of the saddle and corresponding surfaces 25 and 27 of the cap are angularly offset from each other and from a common axis going through the center of the bearing bore. As here shown, the offset is of the order of about 15°, although it will be appreciated that the exact angle of the offset is not critical. With this construction, cap 12 fits more tightly on saddle 15 so that the two elements can provide a unitary structure when securely bolted together by bolts 13 and 14.

It will also be noted that bolts 13 and 14 are angularly disposed with the axis of the crankshaft, or more accurately they are angularly disposed with surfaces 17 and 18. With this construction, bolt 13 provides a force component to clamp leg 22 against the side of saddle 15 as well as the force component bringing surface 19 against surface 25. Similarly, bolt 14 provides a force component clamping leg 23 against surface 18 of saddle 15 as well as bringing surfaces 20 and 27 securely together. Bolts 13 and 14 are accurately positioned by internal threads 28 and 29, and surfaces 30 and 31 on the cap, with the bolts fitting through oversize bores 32 and 33.

Figure 2:
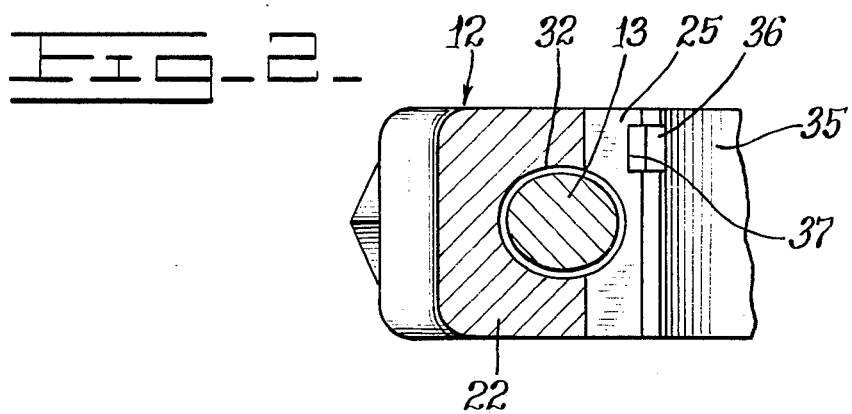
FIG. 2 is a cross-sectional view taken substantially along the line 2—2 of FIG. 1.

The remainder of the structure here shown is more or less conventional with bearing half shells 34 and 35 disposed within bearing bores 16 and 21. As shown in FIG. 2, bearing shell 35 has a tab 36 fitting into a recess 37 to restrain it against axial movement. Similarly, bearing shell 34 is retained by means not shown.

Thus, it is seen that an improved crank pin end and cap construction is provided by the present invention, which provides a connecting rod capable of being removed through the cylinder, yet which will fit a relatively large crankshaft. In addition, it is seen that the crank pin end and cap construction is completely symmetrical to avoid the difficulties of uneven wear arising in certain of the prior art constructions, yet which is formed with a minimum of parts and self-alignment capabilities to facilitate assembly thereof.

What is claimed is:

1. A connecting rod assembly, comprising
   a connecting rod;
   a saddle formed at the end of said connecting rod having an inner cylindric surface, a pair of outer surfaces, and a pair of end surfaces with each of said end surfaces extending between said cylindric surface and one of said outer surfaces;
   a cap having an inner cylindric surface sized to match the cylindric surface in said saddle;
   said cap also being formed with legs having inner surfaces adapted to provide a matching configuration with the said outer surfaces and said end surfaces of the saddle; and
   a pair of connecting bolts disposed on opposite sides of said cylindric surfaces for securing the cap to the saddle;
   said saddle being formed with a width slightly exceeding the diameter of said cylindric surface, whereby the saddle is small enough to allow the connecting rod to be removed through its associated cylinder, and said cap being formed with legs thicker than the width of each end surface of the saddle, whereby the saddle is strengthened at the sides adjacent the ends thereof.

2. A connecting rod assembly as defined on claim 1, wherein the connecting bolts are angularly disposed with respect to the connecting rod, whereby the cap is tightly clamped to both the outer surfaces and the end surfaces of the saddle.

3. A connecting rod assembly comprising
   a connecting rod;
   a saddle formed at the end of said connecting rod having an inner cylindric surface, a pair of outer surfaces, and a pair of end surfaces with each of said end surfaces extending between said cylindric surface and one of said outer surfaces;
   a cap having an inner cylindric surface sized to match the cylindric surface in said saddle;
   said cap also being formed with inner surfaces having a matching configuration with the said outer surfaces and said end surfaces of the saddle; and
   a pair of connecting bolts disposed on opposite sides of said cylindric surfaces for securing the cap to the saddle;
   the outer surfaces of the saddle being substantially parallel, and the end surfaces of the saddle being flat and each disposed at an acute angle with respect to its adjacent outer surface.

4. A crankpin end and cap assembly, comprising
   a connecting rod having a saddle at the lower end thereof;
   said saddle being formed with a pair of side sections having substantially parallel outer surfaces and a pair of substantially flat end sections with a cylindric surface of substantially semicircular cross-section disposed between said flat end sections for receipt of an upper bearing shell and the upper surface of a crankshaft journal;
   a cap having a cylindric surface of substantially semicircular cross-section for receipt of a lower bearing shell and the lower surface of a crankshaft journal;
   said cap also having a pair of upstanding legs formed with inner surfaces adapted to fit against the outer surfaces of the saddle, and a pair of thrust surfaces adapted to fit in matching relation against the end sections of said saddle; and a pair of connecting bolts disposed on opposite sides of said cylindric surfaces for securing the cap to the saddle.

5. A connecting rod assembly as defined in claim 4, wherein the connecting bolts are angularly disposed with respect to the connecting rod axis.

6. A connecting rod assembly as defined in claim 4, in which the outer surfaces of the saddle are substantially parallel, and the end surfaces are each disposed at an acute angle with respect to its adjacent outer surface.

\* \* \* \* \*